United States Patent
Menzel

[11] 3,930,535
[45] Jan. 6, 1976

[54] APPARATUS FOR THE PREPARATION AND DISPENSING OF SOFT ICE-CREAM

[75] Inventor: Waldemar Menzel, Kulmbach, Germany

[73] Assignee: Ireks Arkady GmbH, Kulmbach, Germany

[22] Filed: Mar. 14, 1974

[21] Appl. No.: 451,277

[30] Foreign Application Priority Data
Mar. 20, 1973 Germany............. 2313715

[52] U.S. Cl. .............. 165/27; 62/342; 165/64
[51] Int. Cl.² ........................................ F25B 29/00
[58] Field of Search ...... 62/342, 343; 165/2, 61–66, 165/27

[56] References Cited
UNITED STATES PATENTS

| | | | |
|---|---|---|---|
| 2,215,729 | 9/1940 | Ruttimann | 165/65 |
| 3,225,821 | 12/1965 | Sollich | 165/64 X |
| 3,285,331 | 11/1966 | Bratland | 62/342 X |
| 3,369,596 | 2/1968 | Macland | 165/64 |
| 3,402,562 | 9/1968 | Menzel | 62/342 X |
| 3,464,220 | 9/1969 | Phelan | 62/342 |
| 3,811,494 | 5/1974 | Menzel | 62/342 X |

Primary Examiner—William E. Wayner
Assistant Examiner—William E. Tapolcai, Jr.
Attorney, Agent, or Firm—Browdy and Neimark

[57] ABSTRACT

An apparatus for the preparation and dispensing of portions of soft ice cream comprises a storage tank and a freezing cylinder disposed below the tank and connected thereto by a replenishing duct. The freezing cylinder having a heating device and an agitator in its interior. The heating device being adapted to cause the contents of the freezing cylinder to be partially evaporated and the steam flowing therefrom into the storage tank heats the contents of the tank to a sterilization temperature.

8 Claims, 4 Drawing Figures

APPARATUS FOR THE PREPARATION AND DISPENSING OF SOFT ICE-CREAM

FIELD OF THE INVENTION

The invention relates to an apparatus for the preparation and dispensing of portions of soft ice cream, consisting of a storage tank and having a freezing cylinder disposed below it and connected with it by a supply duct, the freezing cylinder being provided with a heating arrangement and having an internal agitator.

BACKGROUND OF THE INVENTION

The problem underlying the invention is that of improving an ice-cream maker of this type in such a way that the mixture in the storage tank and in the freezing cylinder can be pasteurized satisfactorily without any risk of the mixture getting burnt during the heating process.

SUMMARY OF THE INVENTION

According to the invention there is provided an apparatus for the preparation and dispensing of portions of soft ice cream comprising a storage tank and a freezing cylinder disposed below the tank and connected thereto by a replenishing duct, the freezing cylinder being provided with a heating arrangement and having an agitator in its interior, wherein the heating device of the freezing cylinder is adapted to cause the contents of the freezing cylinder to be partially evaporated and the steam flowing therefrom into the storage tank heats the contents of the tank to a sterilization temperature.

The ice-cream mixture in the freezing cylinder is thus heated to a temperature in the region of 100°C or slightly above, as a consequence of which part of its water content evaporates as steam. This steam rises into the storage tank located above the freezing cylinder and rapidly gives up its heat of evaporation to the ice-cream mixture stored therein. There is no need for any additional local heating of the storage tank and it is undesirable for this purpose. The rising steam also flows round the exposed parts of the storage tank such as its cover, for example, at least at the end of the heating process, and sterilizes these parts as well. Because the ice-cream mixture in the storage tank, and of course in the supply duct also, is heated by means of the steam, that is to say not by heating which acts from outside, which would produce a temperature liable to cause burning, at least in its area of contact, there is no possibility at all of the mixture getting burnt and thus spoiling the taste of the ice cream.

In a particularly advantageous manner, the freezing cylinder consists of a thick-walled tube in the wall of which there is provided a helical cooling channel which is closed off externally by a shrunk-on tube resting tightly on the web coil part which remains. The heating system is fixed on to this outer tube. This construction of the freezing cylinder gives it a high coefficient of heat transmission so that the contents of the freezing cylinder can be heated extremely quickly since the heat is transmitted directly through the outer tube and the web coil part to the remaining inner portion of the tube wall and from there to the ice-cream mixture in the freezing cylinder. Thus heat transmission is effected substantially by means of thermal conduction by metal. However, this good transmission is an important precondition for the rapid heating of the contents of the freezing cylinder up to evaporation temperature.

With this construction according to the invention the inner portion of the tube wall remaining in the range of the cooling channel is advantageously thin in relation to the total wall thickness of the tube. Consequently, it is possible at the same time, after heating, i.e., after sterilization of the contents of the freezing cylinder and storage tank, to cool the contents of the freezing cylinder extremely quickly to the region of the freezing temperature, e.g., to 2°C. This is important so that the temperature range between 50° and 40°C is passed through rapidly because within this range any germs which are still living might be able to propagate themselves. Experience has shown, furthermore, that germs which have already been severely damaged by heat can be killed off by cold shock. This cooling efficiency is made possible, again, through the fact that very good transmission of heat or cold is possible for the cooling agent also, owing to the thinness of the inner part of the tube wall. In this way also, therefore, the sterilizing effect is improved.

Finally, in spite of the thinness of the inner part of the tube wall but on account of the web coil part which is left standing, the tube is extremely stable. The effect of this is that the inner surface of this tube, i.e., the inner cylinder surface of the freezing cylinder, can be produced with extremely precise dimensions and great dimensional stability. This, in turn, means that the agitating mechanism which is constructed in the form of an agitating and scraping unit always makes exact contact with the cylinder surface and scrapes off any ice mixture which is pressed on to the wall by the agitator, thus entirely eliminating the risk of the ice mixture getting burnt. This effect is also present in the cooling of the ice mixture to freezing temperature, whereby the formation of undesirably large ice crystals is avoided which would likewise spoil the flavor. The great stability of the freezing cylinder is thus a further advantageous precondition for the fact that the contents of the freezing cylinder can be heated to evaporation temperature at all.

It is advantageous, furthermore, if an electrically acting heating arrangement is fitted only in that region of the outer surface of the freezing cylinder which is being acted upon from within by the agitating and scraping mechanism. This ensures that heat is not introduced at a point in the freezing cylinder where there is no continuous scraping of ice-cream mixture off the inner wall of the tube.

In accordance with a further advantageous feature of the invention a thermostat is connected into the circuit of the heating arrangement to prevent the temperature of the freezing cylinder exceeding a temperature lying above the temperature of evaporation, the sensor of this thermostat being fitted to the freezing cylinder, while a further thermostat is provided which finally breaks the circuit when a temperature is reached which is adequate for the sterilization of the contents of the storage tank and which has its temperature sensor fitted to the storage tank.

The effect of this is on the one hand to prevent overheating of the contents of the freezing cylinder, but on the other hand to ensure that the contents of the storage tank are brought to a temperature adequate for pasteurization, e.g., 80°C. Only when this temperature has been reached is the heating process finally terminated. The thermostat associated with the freezing cylinder is designed for example for a temperature of between 110° and 120°C. This automation of the heating process is achieved in a simple manner by the fact that the further thermostat, that is to say the one associated with the storage tank, is used for the locking of a relay connected in the heating circuit, and a driving motor for the agitating and scraping unit can be switched on and off by way of one of its switching contacts. This ensures that the agitator and scraper is in operation throughout the whole heating process and continues to scrape off any ice-cream mixture which has settled on the inner wall of the freezing cylinder and mix it again with the rest of the mixture.

To prevent the refrigerating system of the machine from being set in operation when the heating is switched on and, on the other hand to see that when the heating process is ended the refrigeration is switched on immediately, the relay advantageously has a switching contact which is closed in the rest position of the relay and which is connected in the circuit of a refrigerating machine. It is particularly advantageous if two thermostats are connected in the circuit of the refrigerating machine, the temperature sensor of one being fitted to the freezing cylinder and that of the other to the storage tank, and if the storage tank and the freezing cylinder have refrigerating circuits separate from one another and not capable of being switched on simultaneously, the refrigerating circuit of the freezing cylinder being connected for priority over that of the storage tank. The effect of this, for the actual pasteurization process, is that when a temperature is reached in the storage tank which is adequate for pasteurization of the contents of the storage tank, at first only the freezing cylinder is cooled, so that the temperature of about 75° to 80°C in the storage tank is maintained for a period of 6 to 10 minutes so that the sterilization process remains active there for a further period.

This circuit further ensures, during normal operation, that as portions of ice cream are taken out, the freezing cylinder is cooled rapidly and preferentially. This is justified by the fact that in this case, of course, the length of time spent in the storage tank by the ice mixture is so brief that no germ development can occur.

An embodiment of the invention will now be described by way of an example and with reference to the accompanying drawings.

DETAILED DESCRIPTION

Figure 2:
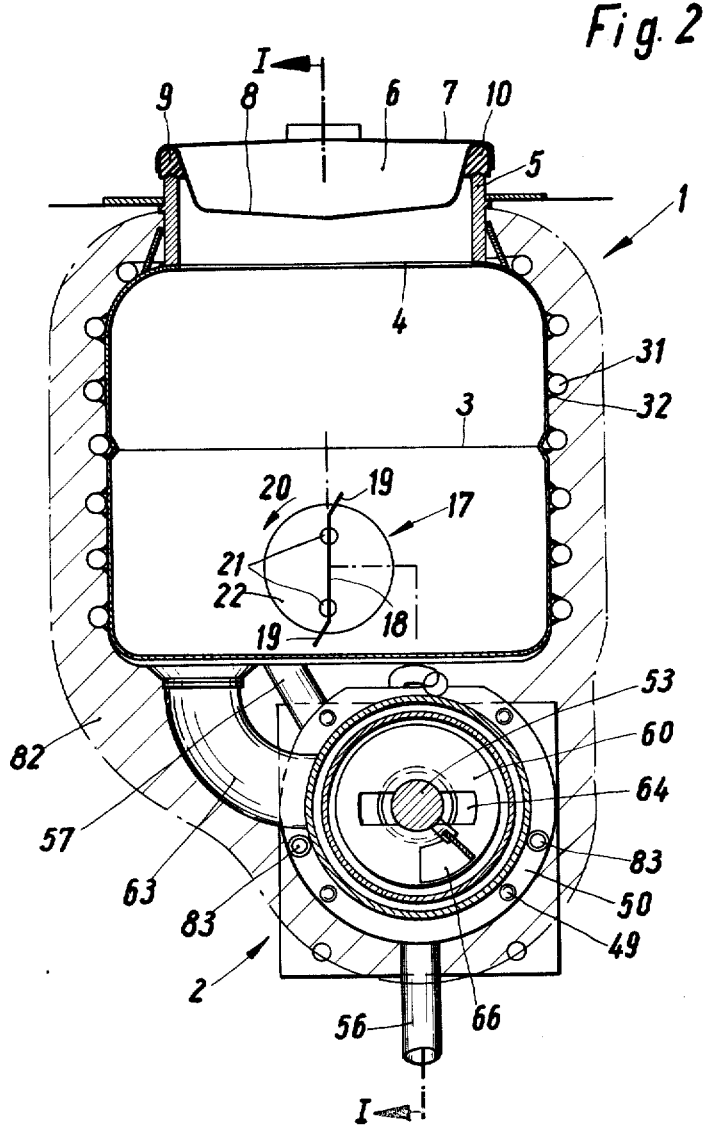
FIG. 2 is a cross-section through the soft ice-cream maker taken along the line II—II in FIG. 1.

A soft ice-cream maker according to the invention consists essentially of a storage tank 1 and a freezing cylinder 2. The storage tank is substantially cuboid in shape with rounded edges and corners. It is manufactured from two identical moulded parts for example of stainless steel which are placed together and joined by a welded seam 3 (FIG. 2). The storage tank has a filler hole 4 in its top wall to the edge of which a short, peripheral filling nozzle 5 is welded to the storage tank. This filling nozzle, which is in the form of a short, cylindrical ring, is closed by a double-walled cover 6, the outer shell 7 of which consists, like the storage tank 1, of stainless steel, whereas the inner shell 8 may be of a synthetic plastics material.

In the cavity formed between the two shells 7 and 8 of the cover it is possible to put insulating material. The outer edge 9 of the cover is bent over downwardly so that a peripheral groove is formed between the inner shell and this outer edge 9, which groove receives a seal 10 of corresponding cross-section which is fitted on the filling nozzle 5, so that a germ-tight and pressure-tight closure of the storage tank 1 can be obtained. The cover is connected to the filling nozzle 5 by a hinge 11 on the other hand it is provided, on the side opposite the hinge 11, with a projecting closing pin 12. When the cover 6 is closed a locking layer 13 can be pushed over this closing pin 12, which locking lever has fitted to its handle 14 an eccentric cam 16 which is pivoted round an axle 15 and which, by depression of the handle 14 from a vertical position into a horizontal position as shown in the drawing, forces the closing pin 12 and with it the cover 6 downwards, i.e., on to the seal 10. This guarantees a totally dependable closure of the cover 6.

Disposed in the vicinity of the bottom of the storage tank 1 is an agitator 17 with a horizontal axis of rotation. The agitating implement of this agitator consists of an oblong, flat, substantially rectangular sheet metal strip or blade 18, the longer sides 19 of which are bent over in opposition to the direction of rotation 20 (FIG. 2).

Figure 1:
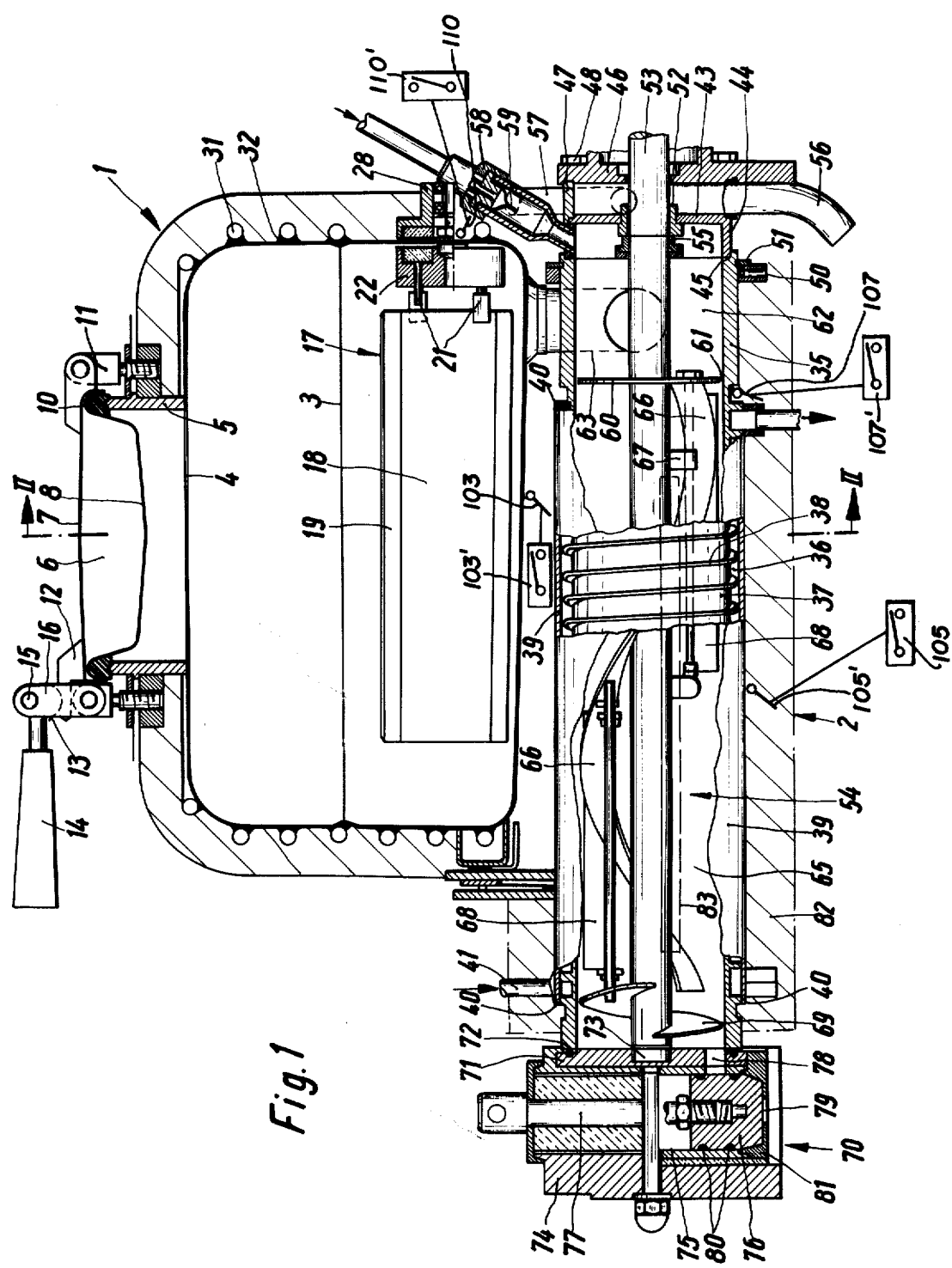
FIG. 1 is a vertical longitudinal section through a soft ice-cream maker taken along the line I—I of FIG. 2, the freezing container being partially cut away.
Figure 1A:
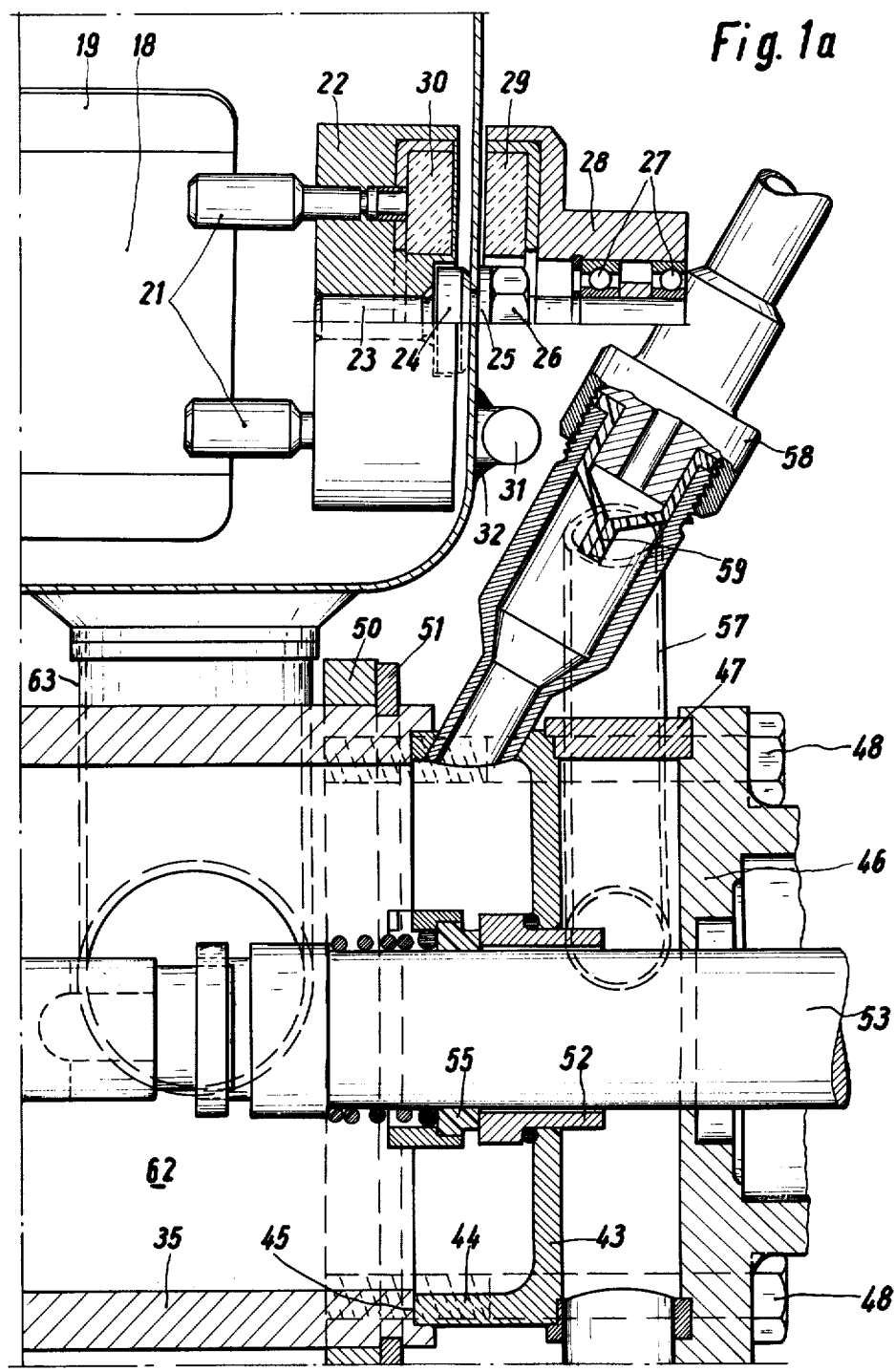
FIG. 1a shows the right-hand portion of FIG. 1 on a larger scale.

The agitating implement formed by the sheet metal blade 18 is connected as shown in FIG. 1a by two pins 21 with a ring bearing 22 which is rotatably mounted on an axle 23. This axle 23 is taken outwards through a bore in the side wall of the storage tank 1 and is held in this side wall by means of an inner collar 24, a washer 25 pushed on to the pin from outside and a nut 26 screwed up against it, so as to be incapable of turning in the tank wall. Mounted on the portion of the axle 23 outside the storage tank 1 by ball bearings 27 is a rotatable sleeve 28 which can be driven by a motor (not shown). Fixed in the sleeve 28 at an adequate distance from the axis of the axle 23, on its side facing the storage tank 1, is a permanent magnet 29.

Also disposed in the ring bearing 22 of the agitator 17, on the side facing the wall of the storage tank and at the same distance from the axis of the axle 23, is an identical permanent magnet 30. Because of the magnetic field developing between these two permanent magnets 29, 30, the agitator 17 is caused to rotate when the sleeve 28 rotates. This type of construction of the agitator 17 has the effect that no rotating parts pass through the wall of the storage tank, which parts could only have been sealed at considerable cost and even then not in a completely germ-tight and pressure-tight manner.

The function of the agitator 17 is to stir the ice mixture in the storage tank continuously, i.e., the viscous basic mass from which a soft ice cream is made, in order that the whole contents of the storage tank shall always be at the same temperature. In addition, this prevents any possible separation of the individual ingredients of the ice-cream mixture.

A cooling coil is disposed round the side walls of the storage tank 1, the cooling coil 31 consisting of a continuous pipe which is wound spirally on the wall of the storage tank 1. This cooling coil 31 is soldered to the outer wall of the storage tank 1 by means of soft solder 32, that is to say by tin solder, in order to obtain a good transmission of heat between the cooling coil 31 and the walls of the storage tank 1.

The freezing cylinder 2 consists essentially of a thick-walled tube 35 of high-grade alloy, corrosion-proof steel, for example a high-grade alloy chromium-nickel steel. Turned in this tube 35 over most of its length is a helical channel 36 which is cut so deeply into the wall of the tube 35 that the closed, inner part of the tube wall which remains is only 1.5 to 2.5 mm thick. This provides an extremely good transmission of heat through this portion of the tube wall 37. Since, on the other hand, the helical web 38 which remains standing is relatively high, for example 7 mm, the tube 35 has an extraordinarily high degree of stability.

An outer tube 39 is shrunk on to the part of the tube 35 provided with the helical channel 36 and welded to the tube 35 at both ends with a peripheral welded seam 40. The fact that the outer tube 39 is shrunk on to the tube 35 guarantees that the inside of the outer tube 39 is a continuous tight fit on the web 38 which traverses it so that a refrigerant pumped through the helical channel cannot flow in short circuit between the web 38 and the outer tube 39 but only along the path determined by the channel 36.

Fixed at one end (shown on the left in FIG. 1) of the helical channel 36 is a pipe union 41, which is attached to the outer tube 39, through which pipe union a refrigerant is supplied to the helical channel 36, from a known commercial refrigerating machine, for example "Freon" (Registered Trade Mark). After flowing through the channel 36 and so cooling the contents of the freezing cylinder 2, this refrigerant leaves the helical channel at the other end, through an outlet pipe union fitted there, and is conducted back to the refrigerating machine.

The tube 35 is closed at one end (the right hand end in FIG. 1) by a closing part 43 which has a relatively short part 44 in the form of a cylindrical ring which engages in a centering edge 45 at the end of the tube 35, so that this closing part 43 is located radially with respect to the tube 35. This closing part 43 is pressed against the end of the tube 35 by way of a flanged ring 46, which rests externally by a ring land 47 against the closing part 43, by means of bolts 48, these bolts 48 engaging in corresponding tapped holes 49 of a flange 50 which is fixed axially on the tube 35 by means of a retaining ring 51.

Fitting in the closing part 43 coaxially with the tube 35, i.e., coaxially with the freezing cylinder 2, is a bearing bush 52 in which a shaft 53 of an agitating and scraping unit 54 is mounted at one end. Seals 55 are also fitted on the bearing bush 52, making contact with the shaft 53, preventing any ice-cream mixture in the freezing cylinder 2 from passing through to the outside. The shaft 53 which likewise passes through the flanged ring 46 can be driven by an electric motor (not shown), for example by way of a V-belt drive.

Leading down out of the chamber formed between the closing part 43, the ring land 47 and the flanged ring 46 is a drainage pipe 56 to allow any ice-cream mixture to run off which may possibly have leaked through between the bearing bush 52 and the shaft 53 in spite of the seals 55. Leading obliquely upwards out of this chamber, which has already been mentioned, there is also an observation tube or sight glass 57 through which an operator can look into said chamber to check whether the seal 55 on the shaft 53 is in perfect order. Opening into the cylindrical part 44 of the closing part 43 is a compressed air inlet 58 through which compressed air is forced into the interior of the freezing cylinder 2 at periodic intervals. A lip valve 59 ensures that the compressed air forced into the freezing cylinder 2, or any ice mixture in the freezing cylinder, is unable to return into the compressed air pipe. The compressed air supply is obtained from a commercial compressor or from a compressed air cylinder.

Mounted on the shaft 53 at some distance from the closing part 43 is a disc 60 acting as a partition wall which defines only a very narrow gap 61 with the inner wall of the tube 35, so that a local restriction is created.

Opening into the antechamber 62 formed by the partition wall 60 and the closing part 43 is a pipe 63 which connects the storage tank 1 to the freezing vessel 2. The ice mixture flows through this pipe, which has a relatively large cross-section of 10 cm² for example, out of the storage tank 1 into the freezing cylinder 2. The upper edge of this curved pipe 63 opens into the tube 35 in the upper quarter, somewhat below the upper edge of the tube 35. The antechamber 62 is not cooled, that is, the disc 60 acting as a partition is located approximately at the point where the helical cooling channel 36 ends.

In the disc 60 acting as a partition is a substantially rectangular cutout 64 (FIG. 2) through which the ice-cream mixture can pass into the actual freezing chamber 65 surrounded by the helical cooling chamber 36 which lies on the other side of the partition 60. In this freezing chamber a helical agitating helix 66 is fixed to the shaft 53 by means of spacing bolts 67. The compressed air which is forced by way of the compressed air inlet 58 into the antechamber 62 and from there through the gap 61 into the freezing chamber 65 is beaten into the ice mixture by the agitating helix giving the ice cream its creamy, light consistency. At the same time this agitating helix 66 of the agitating and scraping unit 54 forces the ice-cream mixture towards the outlet end of the freezing cylinder 2. Also mounted on the shaft 53 are two scraper blades 68 which rest against the inner wall of the tube 35 and which scrape the ice-cream mixture continuously off the inner wall of the freezing cylinder 2.

Since, in spite of the thinness of the inner tube wall part 37 but on account of the relatively great height of the helical web 38, the tube 35 has such great stability of shape, the tube 35 can be constructed internally with a very precise and dimensionally stable cylindrical cross-section so that the scraper blades 68 always run precisely on the wall of the tube thereby preventing even very small amounts of ice from sticking to the wall of the tube.

Adjoining the agitator helix 66 on the shaft 53 there is also a worm 69 with a short helical thread which exerts a certain resistance to the agitator helix 66. At the end of the freezing cylinder 2 opposite the closing part 43 is fitted a so-called tap gate 70; this tap gate 70 has a closing plate 71 shutting off the tube 35, which closing plate is sealed with respect to the tube 35. This closing plate 71 has a recess 73 coaxial with the tube 35 in which the other end of the shaft 53 is rotatably mounted. Fixed to the closing plate 71 is a valve body 74 which has a cylindrical internal cross-section. A piston valve 76 can be moved up and down in this cylindrical bore 75 by means of a piston valve rod 77. Fitted in the closing plate 71 at the lowest point of the tube 35, i.e., of the freezing cylinder 2, is an outlet orifice 78 through which, after the piston valve 76 has lifted, soft ice cream can flow out, passing through a lower tap opening, from which it can be collected in a receptacle such as a cone, a cup or a wafer, or the like.

Since in its cylindrical portion the piston valve 76 rests against the wall of the cylindrical bore 75 by means of seals 80 and in addition is constructed in its lower part in the form of a truncated cone and engages in a corresponding valve seat, its complete tightness is ensured when the gap gate 70 is closed.

The storage tank 1 and the freezing cylinder 2 are surrounded completely, except for the cover 6 and the tap gate 70, by a thick-walled jacekt 82 of some suitable insulating material such as glass wool, rock wool, or styrene foam. Fixed to the outer tube 39 so as to give good thermal conductivity, for example by hard soldering with brass solder, are two or more copper tubes 83 extending over the length of the tube, into which copper tubes rod-shaped electrical heating devices can be pushed. Heat transmission from these heating devices is effected by way of the outer tube 39, the web coil part 38, and the inner tube wall 37 of the tube 35, to the ice-cream mixture in the freezing cylinder 2. Since the outer tube 39 is shrunk on to the web coil part 38, good thermal transmission is guaranteed here also.

The manner of operation of the soft ice-cream maker according to the invention is explained below with the assistance of the circuit diagram represented in FIG. 3.

It is assumed that the storage tank 1 is at least partly filled with ice-cream mixture which has also run through the pipe 63 into the freezing cylinder 2. For normal operation compressed air is forced at periodic intervals through the compressed air inlet 58 into the freezing cylinder 2 and beaten into the ice mixture by the agitating and scraping unit 54, the ice mixture being simultaneously cooled down to the requisite temperature of −2° to −6°C by the refrigerant flowing through the helical cooling channel 36. The portions of ice cream when ready can be dispensed by opening the tap gate 70. Ice mixture then flows into the freezing cylinder from the storage tank 1 to replenish it in conformity with the amount of soft ice cream which is removed.

When there is to be a break in the dispensing of the prepared soft ice for any considerable time, for example overnight, the ice mixture in the freezing cylinder 2 and in the storage tank 1 is pasteurized. This process, which takes place completely automatically, is explained with reference to the circuit diagram reproduced in FIG. 3, in which single continuous lines represent electric leads and pipes for refrigerant are represented by double lines. All electric switching devices are shown in the currentless or "off" state in the drawing.

Closing of a master switch 101 connects the circuit arrangement described below to an electric main. Operation of a push-button switch 102 for a short time excites a relay R1. This closes two switching contacts $r1_1$ and $r1_2$, while a third switching contact $r1_3$ of the relay R1 is opened. The closing switching contact $r1_1$ and a thermostat 103 maintain the relay R1 in a locking position, even after release, i.e., the opening of the push-button switch 102, as long as the thermostat 103 is closed. This thermostat 103 is fitted with its thermo-sensor 103' on the storage tank 1. It is adjusted so that it opens at a temperature of 80°C and is closed at temperatures below this.

The rod-shaped heating devices 104 already mentioned, which are situated in the copper tubes 83 on the freezing cylinder 2, are connected to the main way of the closing contact $r1_2$, whereby another thermostat 105 is connected into the current path, its sensor 105' being fitted on the freezing cylinder 2. This thermostat is adjusted so that it is closed below a temperature of 115°C and opens when this temperature is reached. Furthermore, the driving motor 106 for the agitating and scraping unit 54 is switched on by way of the closing contact $r1_2$.

Thus the contents of the freezing cylinder 2 are heated to boiling temperature by the above-described switching elements and switching processes. The resultant steam flows through the antechamber 62 and the pipe 63 into the storage tank 1 and heats its contents with the simultaneous condensation of the vapor to 80°C. At the same time the agitating and scraping unit 54 is rotating in the freezing cylinder 2 so that any risk of the ice mixture getting burnt on the inner wall of the tube 35 is eliminated.

The fact that the contents of the storage tank 1, the pipe 63 and the antechamber 62 are heated by steam alone also completely precludes any burning of the ice mixture here. This guarantees that all the mixture is heated to 80°C at least so that perfect pasteurization is ensured. At the same time the steam generated in the freezing cylinder 2 flows round all the parts which in any way come into contact with the ice mixture, including the cover 6 of the storage tank and so here, too, all bacteria are killed.

Figure 3:
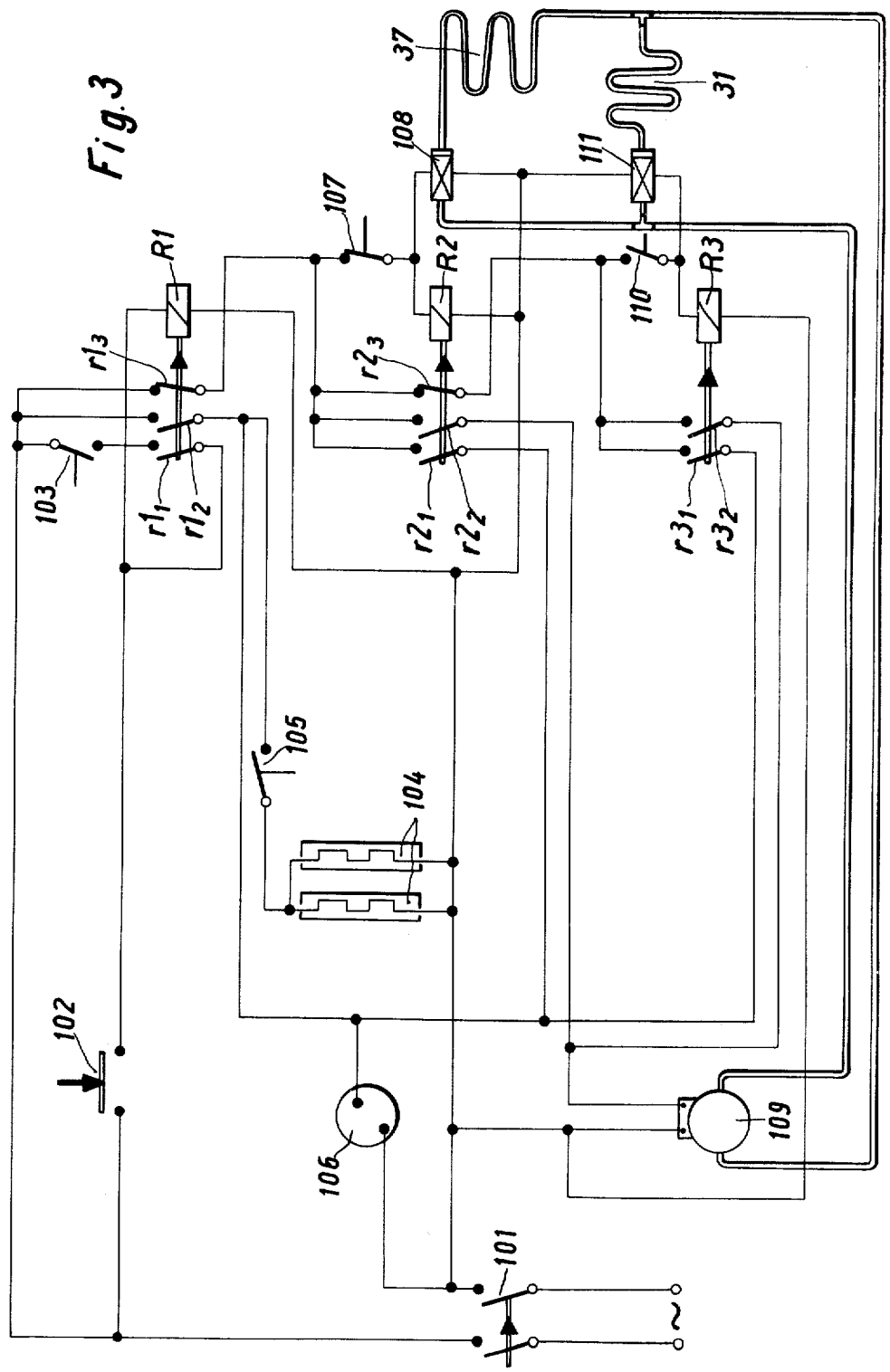
FIG. 3 is a circuit diagram of the automatic pasteurization and refrigeration circuit.

When a temperature of 80°C is reached in the storage tank 1, the thermostat 103 opens so that the relay R1 releases and the switching contacts $r1_1$, $r1_2$ and $r1_3$ return to the switching position represented in FIG. 3. If a temperature of 115°C should already be reached in the tube wall of the freezing cylinder 2 before the temperature of 80°C has been reached in the storage tank 1, the thermostat 105 switches off for a short time and on again after the wall of the freezing cylinder has cooled down sufficiently, but the agitator motor 106 remains switched on continuously. When the temperature of 80°C has been reached in the storage tank and the relay R1 has accordingly released, the heated process of the pasteurization is ended.

The cooling of the ice mixture then immediately takes place automatically, first in the freezing cylinder 2 and then in the storage tank 1. By way of the switching contact $r1_3$, which is closed in the resting state of the relay R1, and a thermostat 107, a relay R2 and a solenoid valve 108 are switched into the circuit. The thermo-sensor 107' of the thermostat 107 is fitted on the freezing cylinder 2. The thermostat 107 is so designed that it is closed at temperatures above 2°C and opens at or below this temperature. So long as the heating process is proceeding in the freezing cylinder 2 and in the storage tank 1, the relay R2 is in the rest position shown in the drawing and the solenoid valve 108 is closed. When the relay R1 releases, the relay R2 pulls up so that the two switching contacts $r2_1$ and $r2_2$ are closed and the switching contact $r2_3$ is opened.

The compressor of the refrigerating machine 109 is switched on by way of the switching contact $r2_2$ and it pumps refrigerant through the cooling channel 37 of the freezing cylinder 2 by way of the solenoid valve 108 which is simultaneously opened. Because of the good thermal conductivity due to the construction of the freezing cylinder 2 in accordance with the invention, its contents are cooled down very rapidly to 2°C. The agitator motor 106 is connected to the main again by way of the other closing switching contact $r2_1$ so that even while it is being cooled down the ice mixture in the freezing cylinder 2 is being continuously circulated and scraped off the wall of the freezing cylinder.

A solenoid valve 111 connected in the cooling circuit of the storage tank 1 is closed by the opening contact $r2_3$ of the relay R2 so that no refrigerant can flow through the cooling pipe 31 of the storage tank 1.

When a temperature of 2°C is reached in the freezing cylinder, the thermostat 107 opens so that the relay R2 releases, whereby on the one hand the compressor of the refrigerating machine 109 is switched off again and furthermore the agitator motor 106 is switched off. The contact $r2_3$ is closed simultaneously so that by way of a thermostat 110 the solenoid valve 111 connected in the cooling circuit of the storage tank 1 is opened and a relay R3 pulls up. The thermosensor 110' of the thermostat 110 is fitted on the storage tank. This thermostat 110 is designed to be closed at temperatures above 2°C and opened at temperatures of 2°C and below. When the relay R3 pulls up and its switching contact $r3_1$ closes the agitator motor is switched on and when its switching contact $r3_2$ closes the compressor of the refrigerating machine 109 is switched on, so that refrigerant is pumped through the cooling pipe 31 of the storage tank 1 by way of the solenoid valve 111 until its contents have reached a temperature of 2°C. When this temperature is reached the thermostat 110 opens, with the result that the relay R3 releases into the rest position shown in the drawing and the solenoid valve 111 is closed.

As a result of this switching operation the ice mixture in the freezing cylinder 2 and in the storage tank 1 is then held automatically at the temperature adjusted on the thermostats 107 and 110, priority always being given to the freezing cylinder 2, since with the closing of the thermostat 107 and the associated opening of the switching contact $r2_3$ of the relay R2, the solenoid valve 111 of the refrigerating circuit of the storage tank 1 is closed.

Since, owing to the construction of the freezing cylinder 2 in accordance with the invention, the ice mixture contained therein can be cooled down very rapidly, it is ensured that any germs and bacteria which may still be present after the pasteurizing process cannot propagate themselves afresh and that furthermore any germs which are not quite dead will be killed off by the low-temperature shock.

What we claim is:
1. An apparatus for the preparation and dispensing of portions of soft ice cream comprising:
    a storage tank;
    a freezing cylinder disposed below said storage tank;
    an agitator located in the interior of said freezing cylinder;
    a replenishing duct connecting said storage tank to said freezing cylinder; and
    a heating means in said freezing cylinder and connected to said storage tank for heating said freezing cylinder and said storage tank, said heating means including a first thermostat means for preventing the exceeding of a temperature lying above the evaporation temperature of the contents of said freezing cylinder, said first thermostat means including a first temperature sensor fitted on said freezing cylinder, said heating means further including a second thermostat means for switching said heating means off when a temperature is reached sufficient for the pasteurization of the contents of said storage tank, said second thermostat means including a second temperature sensor fitted on said storage tank;
    wherein said heating device causes the contents of said freezing cylinder to be partially evaporated and the steam flowing therefrom into said storage tank heats the contents of said tank to a sterilization temperature.

2. Apparatus according to claim 1 wherein said helical cooling channel cuts into the interior wall of said thick-walled tube to such degree that the width of the wall in the region of the cooling channel is minimal in comparison with the overall thickness of the wall of the tube.

3. Apparatus according to claim 1, wherein the freezing cylinder is formed by a thick-walled tube in which a helical cooling channel is formed and which is closed outwardly by a shrunk-on tube which rests tightly on a helical web forming the wall of said channel.

4. Apparatus according to claim 1, wherein said heating means of the freezing cylinder is an electrically acting heating device which is fitted to the outer surface of the freezing cylinder only in that region which is acted upon from within by the agitator.

5. Apparatus according to claim 1, further including a relay wherein said second thermostat is used to latch said relay connected in the circuit of the heating arrangement.

6. Apparatus according to claim 1, wherein a driving motor for the agitator and scraping unit is connected in the circuit for the heating device by-passing said first thermostat.

7. Apparatus according to claim 1, further including a relay having a switching contact which is closed in the rest state of the relay and which is connected in the circuit of a refrigerating installation.

8. Apparatus according to claim 7, wherein third and fourth thermostats are connected in the circuit of the refrigerating installation, the temperature sensor of one thermostat being fitted on the freezing cylinder and the temperature sensor of the other thermostat being provided on the storage tank, and the storage tank and the freezing cylinder have cooling circuits, separate from one another and not capable of being switched on together, the cooling circuit of the freezing cylinder being connected for priority over the cooling circuit of the storage tank.

* * * * *